United States Patent
Mentovich et al.

(10) Patent No.: US 10,073,227 B1
(45) Date of Patent: Sep. 11, 2018

(54) SYSTEM AND METHOD FOR CHARACTERIZING THE LOCATION OF OPTICAL COMPONENTS IN AN OPTICAL MODULE

(71) Applicant: Mellanox Technologies, Ltd., Yokneam (IL)

(72) Inventors: Elad Mentovich, Tel Aviv (IL); Itshak Kalifa, Ramat Gan (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 15/614,036

(22) Filed: Jun. 5, 2017

(51) Int. Cl.
*G02B 6/36* (2006.01)
*G02B 6/42* (2006.01)

(52) U.S. Cl.
CPC ......... *G02B 6/4227* (2013.01); *G02B 6/4221* (2013.01); *G02B 6/4224* (2013.01); *G02B 6/4228* (2013.01)

(58) Field of Classification Search
CPC .... G02B 6/4202; G02B 6/422; G02B 6/4227; G02B 6/4223; G02B 6/4224; G02B 6/4204; G02B 6/4214; G02B 6/30; G02B 6/34
USPC ...... 385/88, 92, 93; 398/139, 200, 201, 212, 398/214
See application file for complete search history.

(56) References Cited

U.S. PATENT DOCUMENTS

| | | | |
|---|---|---|---|
| 6,757,063 B2* | 6/2004 | Kogan | G01B 11/272 356/399 |
| 7,485,887 B2* | 2/2009 | Savoia | G01J 1/02 250/221 |
| 8,045,164 B2* | 10/2011 | Lin | G01B 11/272 356/399 |
| 8,836,942 B2* | 9/2014 | Quan | G01B 11/27 348/95 |
| 2006/0187454 A1* | 8/2006 | Shih | H01L 31/0203 356/400 |
| 2007/0002911 A1* | 1/2007 | Sharma | G02B 7/003 372/29.022 |
| 2012/0219257 A1* | 8/2012 | Meadowcroft | H05K 1/0274 385/93 |

(Continued)

FOREIGN PATENT DOCUMENTS

CN 205138421 * 4/2016 ............. G01B 11/00

*Primary Examiner* — Robert Tavlykaev
(74) *Attorney, Agent, or Firm* — Alston & Bird LLP (57) ABSTRACT

Systems and methods are described for characterizing the location of optical components relative to one another for optimizing the performance of the optical module. In particular, a mechanism is provided for a user to visually determine, from a fiber point of view, the alignment and relative positioning of a lens assembly of the optical module with an optoelectronic transceiver, such as a VCSEL or a photodiode. By characterizing a location of the lens assembly with respect to the optoelectronic transceiver in an x-y plane and/or determining a spacing of the components in a z-direction, the user can compensate for expected signal losses through the optical module due to inaccuracies in the relative positioning of the components, adjust the relative positioning of the components in the optical module being examined, or modify manufacturing parameters to improve the accuracy of positioning in the modules and PCBAs yet to be built.

20 Claims, 5 Drawing Sheets

(56) References Cited

U.S. PATENT DOCUMENTS

2013/0051024 A1* 2/2013 Amit ................... H04B 10/40
362/259
2015/0380896 A1* 12/2015 Kimura .............. G02B 27/0955
359/641

* cited by examiner

SYSTEM AND METHOD FOR CHARACTERIZING THE LOCATION OF OPTICAL COMPONENTS IN AN OPTICAL MODULE

BACKGROUND

The present disclosure relates in general to optical components of an optical module for transmitting and receiving optical signals through fiber optic cable systems. In particular, systems and methods are described that allow for more accurate characterization of the location of a lens assembly supported by a printed circuit board with respect to an optoelectronic transceiver of the printed circuit board assembly (PCBA).

The use of fiber optic cable for data transmission has provided several advantages over the use of copper cable. For example, optical fiber offers very high bandwidth, as well as the ability to accommodate increases in bandwidth (e.g., when data traffic spikes). Optical fiber also provides good resistance to electromagnetic interference and is considered to be a very secure transmission medium.

In order to facilitate the conversion between electrical signals and optical signals, optical modules are generally used. The optical modules include optical components for generating, directing, and/or receiving the optical signals. As such, the manufacture and assembly of the optical module is important to the overall performance of the optical system.

BRIEF SUMMARY

Embodiments of the invention described herein therefore provide improved systems and methods for characterizing the location of optical components relative to one another in an optical module for optimizing the performance of the optical module. As described in greater detail herein, embodiments of the invention provide a mechanism for a user to visually determine, from a fiber point of view, the alignment and relative positioning of a lens assembly of the optical module with an optoelectronic transceiver, such as a vertical-cavity surface-emitting laser (VCSEL) or a photodiode. By characterizing a location of the lens assembly with respect to the optoelectronic transceiver in an x-y plane and/or determining a spacing of the components in a z-direction, the user may be able to compensate for expected signal losses through the optical module due to inaccuracies in the relative positioning of the components, adjust the relative positioning of the components in the optical module being examined, or modify one or more manufacturing parameters to improve the accuracy of positioning in the modules and PCBAs yet to be built.

Accordingly, a method of characterizing a location of optical components in an optical module is provided. The method includes determining an x-y alignment of a lens assembly with respect to an optoelectronic transceiver by viewing, from a fiber point of view, a second lens of the lens assembly via a first lens of the lens assembly; determining a center of the second lens; viewing, from the fiber point of view, the optoelectronic transceiver via the first lens and the second lens; determining a center of the optoelectronic transceiver; and measuring an x-y distance between the center of the second lens and the center of the optoelectronic transceiver, where the x-y distance corresponds to the x-y alignment of the lens assembly with the optoelectronic transceiver.

In some cases, viewing, from a fiber point of view, the second lens of the lens assembly may include using an optical microscope to view the second lens of the lens assembly. Moreover, measuring the x-y distance between the center of the second lens and the center of the optoelectronic transceiver may include accounting for a magnification factor of the optical microscope. In some embodiment, an expected loss of optical signal strength through the lens assembly may be determined based on the x-y distance measured between the center of the second lens and the center of the optoelectronic transceiver.

Additionally or alternatively, an x-y position of the lens assembly with respect to the optoelectronic transceiver may be adjusted based on the x-y distance measured between the center of the second lens and the center of the optoelectronic transceiver. In some cases, a manufacturing assembly parameter of a subsequent optical module may be adjusted based on the x-y distance measured between the center of the second lens and the center of the optoelectronic transceiver.

In still other cases, a z alignment of the lens assembly with respect to the optoelectronic transceiver may be determined by determining an observed dimension of a component of the optoelectronic transceiver at a given magnification of an optical microscope, wherein the component has an actual dimension; calculating an expected observed dimension of the component based on the given magnification of the optical microscope; calculating a difference between the observed dimension and the expected observed dimension of the component; and correlating the difference between the observed dimension and the expected observed dimension of the component with a difference between an actual z distance between a surface of the optoelectronic transceiver and a surface of the first lens and an expected z distance between the surface of the optoelectronic transceiver and the surface of the first lens. The difference in z distances may thus correspond to the z alignment of the lens assembly with the optoelectronic transceiver.

In some embodiments, a z position of the lens assembly with respect to the optoelectronic transceiver may be adjusted based on the difference in z distances between the surface of the optoelectronic transceiver and the surface of the first lens that is determined. In still other cases, a manufacturing assembly parameter of a subsequent lens assembly may be adjusted based on the difference in z distances between the surface of the optoelectronic transceiver and the surface of the first lens that is determined.

In some cases, the method may further include focusing on a first surface of the optoelectronic transceiver via the second lens and the first lens; determining a first calibration focus setting for focusing on the first surface of the optoelectronic transceiver; focusing on a second surface of the optoelectronic transceiver via the second lens and the first lens; determining a second calibration focus setting for focusing on the second surface of the optoelectronic transceiver; and correlating a difference between the first and second calibration focus settings with a known thickness of the optoelectronic transceiver. The difference between the observed dimension and the expected observed dimension of the component may be correlated with a difference between an actual z distance between a surface of the optoelectronic transceiver and a surface of the first lens and an expected z distance between the surface of the optoelectronic transceiver and the surface of the first lens using the correlated difference between the first and second calibration focus settings.

The optoelectronic transceiver may, in some cases, be a vertical-cavity surface-emitting laser (VCSEL) or a photodiode. Moreover, the optoelectronic transceiver may be a photodiode.

In still other embodiments, a system for characterizing a location of optical components in an optical module is provided. The system comprises a jig configured to receive a printed circuit board assembly (PCBA) comprising a printed circuit board having an optical module attached thereto, wherein the optical module comprises an optoelectronic transceiver configured to convert between electrical signals and optical signals and a lens assembly supported by the printed circuit board at a spaced apart position relative to the optoelectronic transceiver and configured to communicate optical signals between the optoelectronic transceiver and an optical fiber. The lens assembly may have a first lens, a second lens substantially perpendicular to the first lens, and a mirror configured to direct optical signals between the first lens and the second lens. The system also comprises an optical microscope positioned relative to the jig such that when a PCBA is received by the jig, the optical microscope is disposed proximate the second lens of the lens assembly. In addition, the system may include a processor configured to process inputs received via image data obtained from the optical microscope for determining an x-y alignment of the lens assembly with respect to the optoelectronic transceiver.

In some cases, the processor may be further configured to process the inputs received via the image data obtained from the optical microscope for determining a z alignment of the lens assembly with respect to the optoelectronic transceiver. The system may further comprise a display in communication with the processor, where the display is configured for presenting the image data obtained from the optical microscope. In some embodiments, the jig may comprise a holding portion having a trench configured to receive an end of the PCBA and a clamp configured to be actuated by a user for securing the end of the PCBA within the trench.

The processor may be configured to determine an adjusted manufacturing parameter based at least on the determined x-y alignment and to communicate the adjusted manufacturing parameter to a component of a production line. In some cases, the system may further include an x-y-z manipulator in communication with the processor and configured to adjust a position of the lens assembly of the PCBA relative to a position of the optoelectronic transceiver based at least on the determined x-y alignment.

In some embodiments, the system may be configured to receive the PCBA during a mid-cure state of epoxy securing at least one of the lens assembly or the optoelectronic transceiver to the printed circuit board, thereby enabling the x-y-z manipulator to adjust the position of the lens assembly relative to the position of the optoelectronic transceiver prior to full cure of the PCBA.

Additionally or alternatively, the processor may be configured to determine an expected loss of signal power through the optical module based at least on the determined x-y alignment.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the term "substantially" implies that manufacturing tolerances may be taken into account.

Figure 1:
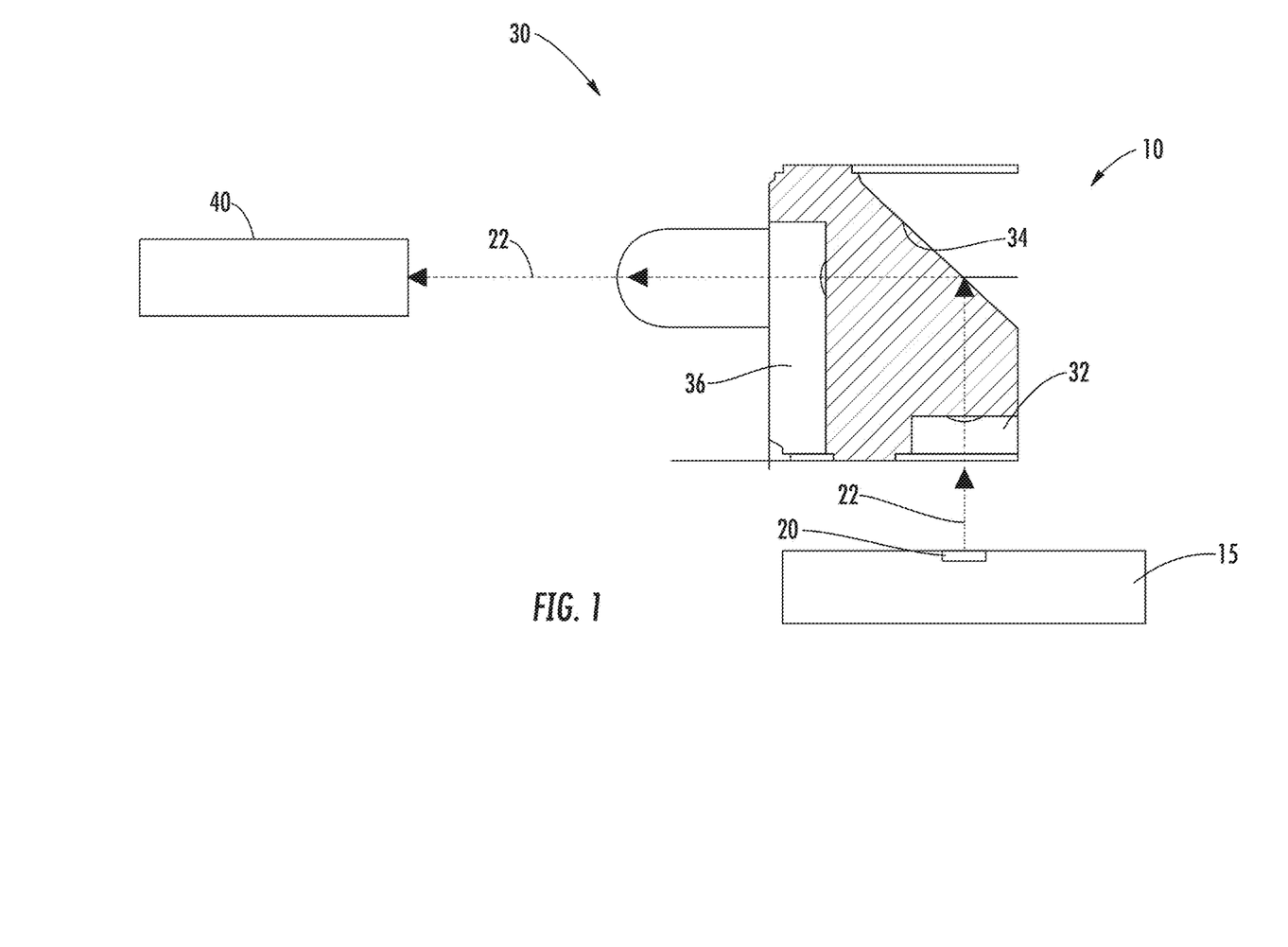
FIG. 1 is a schematic side view of a printed circuit board assembly with a lens assembly, an optical transceiver, and a fiber according to an example embodiment.

In the assembly of optical modules, such as may be used in optical connectors on active optical cables (AOC) and other optical interconnects, the accuracy of the location of the optoelectronic transceiver with respect to the lens assembly of a printed circuit board assembly (PCBA) is of critical importance. With reference to FIG. 1, for example, a portion of an optical module 10 is shown that includes an optoelectronic transceiver 20, a lens assembly 30, and an optical fiber 40. The optoelectronic transceiver 20 may be, for example, a vertical-cavity surface-emitting laser (VCSEL), which is configured to convert electrical signals into optical signals, or a photodiode, which is configured to convert optical signals into electrical signals.

Using the example of an optoelectronic transceiver 20 that is a VCSEL in FIG. 1, for purposes of explanation, the optical path 22 of the optical signals that are generated by the VCSEL is illustrated by a dashed line arrow. In particular, the optical signals will be emitted from the VCSEL and will enter the lens assembly 30 via a first lens 32. The VCSEL may have a diameter of approximately 3-12 μm, while the first lens 32 may have a diameter of approximately 250 μm, as an example. The lens assembly 30 may include a mirror 34 or other reflective surface that is configured (e.g., sized, shaped, oriented, and/or positioned) to direct the optical signal from the first lens 32 to a second lens 36 of the lens assembly. For example, the first lens 32 may be oriented at a 90° angle with respect to the second lens 36, and thus the mirror 34 may be configured to direct the path of travel of the optical signal from a first direction (shown between the first lens and the mirror) to a second direction (shown between the mirror and the second lens) that is substantially perpendicular to the first direction. The optical signal may then travel out of the lens assembly 30 via the second lens 36 and into the optical fiber 40, which is positioned adjacent to and in alignment with the second lens, as illustrated.

Similarly, in a case where the optoelectronic transceiver 20 is a photodiode (not shown), the optical path 22 is reversed, such that an optical signal would be received into the lens assembly 30 from the optical fiber 40 via the second lens 36; be directed to travel towards the first lens 32 via the mirror 34; and exit the lens assembly via the first lens 32 to be received by the photodiode (the optoelectronic transceiver 20 in FIG. 1).

In either case, the location of the optoelectronic transceiver 20, the lens assembly 30, and the optical fiber 40 will set the optical path 22 of the optical module 10. Moreover, the location of the first lens 32, with respect to the location of a surface of the optoelectronic transceiver 20 will generally have a significant effect on the yield of the optical module and the performance of the optical connector.

In conventional manufacturing scenarios, the accuracy of the location of the lens assembly 30 with respect to the optoelectronic transceiver 20 is based on the tolerances of the design and the accuracy with which the components can be placed and affixed to the printed circuit board (PCB) 15. Moreover, characterization of the location of the components (e.g., the lens assembly 30 and the optoelectronic transceiver 20) in the production line is determined electrically, only, under conventional methodologies, such that the only mechanism for evaluating the optical path defined by the placement of the lens assembly and the optoelectronic transceiver is by evaluating the electrical performance of the complete AOC or optical module. The electrical performance of the complete AOC or optical module, however, can be affected by a number of parameters, in addition to the location of the optoelectronic transceiver 20 and the lens assembly 30, such that identifying a direct correlation between non-optimal electrical performance and a misalignment in the optical module 10 can problematic, if not impossible. In addition, although according to some conventional methods visual inspection can be used to determine the proper location of the optical components, such methods are neither fast enough nor accurate enough to fully optimize performance of the optical module.

Through hard work and applied ingenuity, the inventors have discovered new techniques for characterizing the location of optical components of an optical module through the use of a new station in the production line itself. In particular, embodiments of the present invention provide a new in-line system that can be implemented using an optical microscope and provides a reverse optical path line-of-sight that allows an operator, from the point of view of the optical fiber, to determine the relative and absolute locations of optoelectronic transceivers and lens assemblies, compensate for inaccuracies in misalignment, adjust the location of optical components in the tested optical module, and/or modify manufacturing parameters to produce more accurate optical modules further downstream in an effort to minimize future yield loss from the observed inaccuracies. According to some embodiments of the systems and methods described herein, the accuracy with which the positioning of components may be determined can be improved up to four-fold as compared to conventional techniques.

Figure 2:
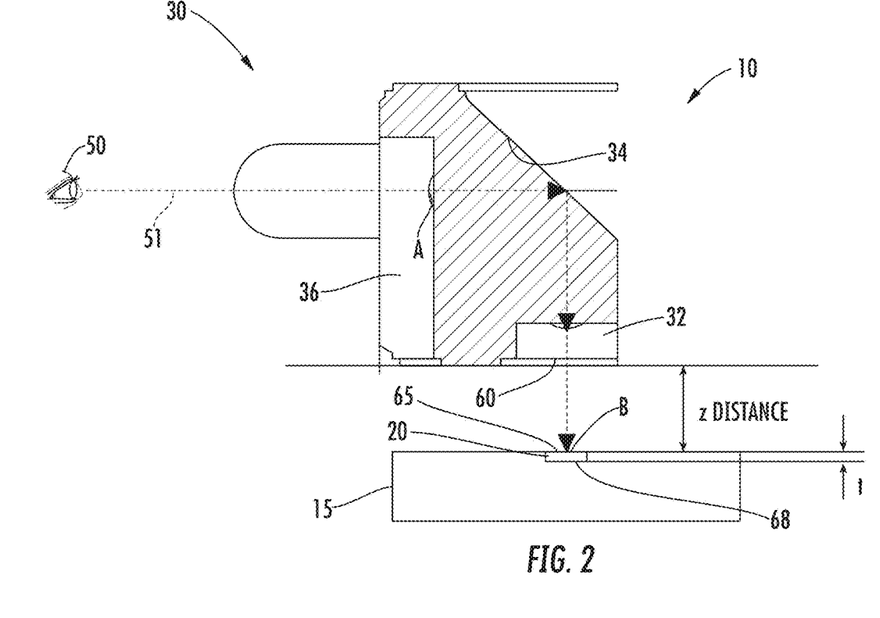
FIG. 2 is a schematic side view of a printed circuit board assembly showing a lens assembly and an optoelectronic transceiver and depicting a user's line of sight according to an example embodiment.
Figure 3:
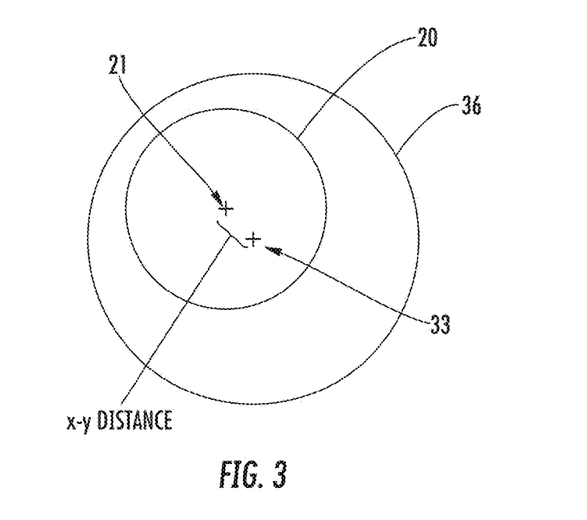
FIG. 3 is a schematic top view of the second lens of the lens assembly and the optoelectronic transceiver of FIG. 2 as seen via the user's line of sight depicted in FIG. 2 according to an example embodiment.

With reference now to FIGS. 2 and 3, embodiments of a method of characterizing a location of optical components in an optical module is described herein, where an x-y alignment of the lens assembly 30 with the optoelectronic transceiver 20 is determined by viewing the second lens 36 and the optoelectronic transceiver 20 from the point of view of the fiber, where the user is represented in FIG. 2 by the eye 50. As such, FIG. 3 represents a view of the optoelectronic transceiver 20 and the second lens 36 by the user 50 along a line of sight 51 that follows the optical path 22 (shown in FIG. 1) from the user's eye, through the second lens 36, to the first lens 32 via the mirror 34, and then to the optoelectronic transceiver 20. Additionally, in some embodiments, a z alignment of the lens assembly 30 with respect to the optoelectronic transceiver 20 may further be determined, as described in greater detail below.

According to embodiments of the method, an x-y alignment of a lens assembly 30 with respect to an optoelectronic transceiver 20 may be determined by viewing, from a fiber point of view, the second lens 36 and the via the first lens 32 of the lens assembly 30. In some cases, for example, the user 50 may view the second lens 36, such as through an optical microscope, and may focus on the contour (e.g., curved portion) of the second lens 36 (focal point A in FIG. 2). With the second lens 36 in focus, the center of the second lens may be determined.

Figure 4:
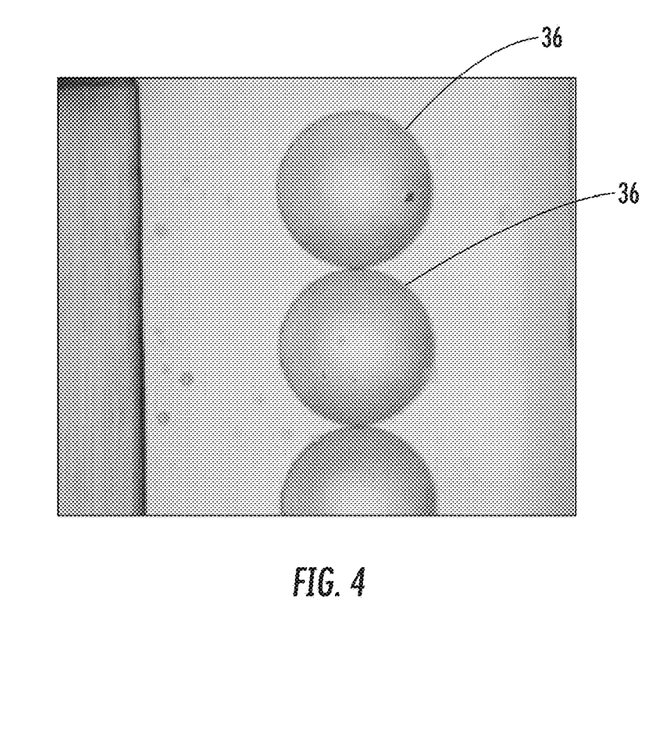
FIG. 4 illustrates an image of an array of second lenses of a lens assembly as seen via an optical microscope and presented on a display to the user according to an example embodiment.

In some cases, for example, a computer software application (e.g., as implemented by a processor based on computer program product stored on a memory, as described in greater detail below) may be used that allows the user to mark three points along the circumference of an image of the second lens 36. An example image that may be provided by such software for allowing the user to demarcate the three points is shown in FIG. 4. The array of second lenses 36 of FIG. 4 is shown at a magnification of 10X, for purposes of this example. The computer software application may then calculate the center of the second lens 36 using analytic geometry, as would be understood by one skilled in the art in view of this disclosure. For example, equations for calculating the center of a circle passing through three points (e.g., the three points marked by the user) may be executed by a processor running the computer software, in some embodiments, and upon receiving the indication of the three points by the user on a display on which the image of the second lens 36 is presented (e.g., via mouse clicks made by the user at the three locations or via user inputs received on a touch screen), the computer software may calculate the geometric center of the defined circle using such equations and may further present the center on the displayed image of the first lens, along with the defined circle and/or the points along the circumference indicated by the user. In FIG. 3, the calculated center of the second lens 36 is depicted as a cross 33.

Figure 5:
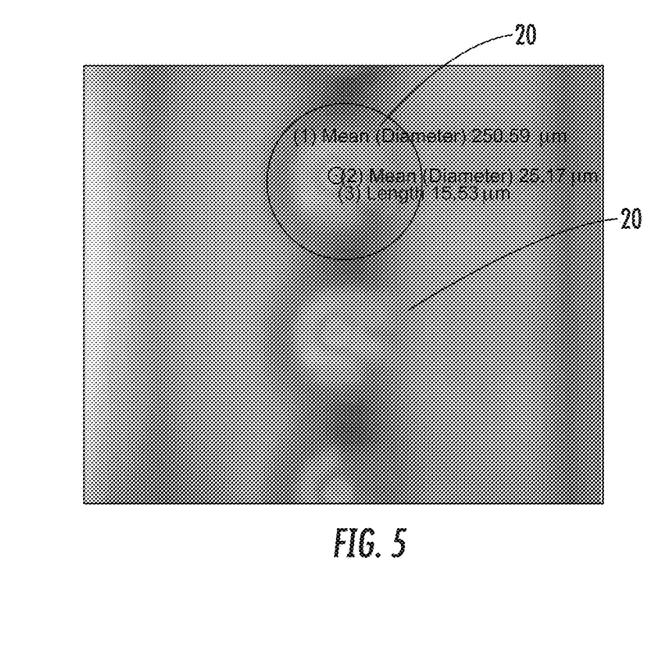
FIG. 5 illustrates an image of an optoelectronic transceiver in the form of a VCSEL as seen via an optical microscope and presented on a display to the user according to an example embodiment.

Similarly, the optoelectronic transceiver 20 may also be viewed, from the fiber point of view, via the second lens 36 and the first lens 32 of the lens assembly 30, such as by focusing on the optoelectronic transceiver 20 aperture at a focal point B, and a center of the optoelectronic transceiver may likewise be determined. Continuing the example above, in some embodiments, the computer software application may present the image of the optoelectronic transceiver 20 (e.g., via the optical microscope), as illustrated in FIG. 5, and the application may thus allow the user to mark three points along the circumference of the optoelectronic transceiver. In the example of FIG. 5, the optoelectronic transceiver 20 is a VCSEL and is shown at a magnification of 10×, for purposes of this example. The computer software application may then calculate the center of the optoelectronic transceiver, again using analytic geometry, upon receiving the indication of the three points by the user on the display on which the image of the optoelectronic transceiver 20 is presented, and the computer software may likewise calculate the geometric center of the defined circle and may further present the center on the displayed image of the optoelectronic transceiver. In FIG. 3, the calculated center of the optoelectronic transceiver 20 is depicted as a cross 21.

In an instance in which the optoelectronic transceiver 20 supported by the PCB 15 is perfectly aligned with the second lens 36 (e.g., along the optical path) and with the lens assembly 30, the center 21 of the optoelectronic transceiver 20 would coincide exactly with the center 33 of the second lens 36. Accordingly, by measuring an x-y distance (shown in FIG. 3) between the center 33 of the second lens 36 and the center 21 of the optoelectronic transceiver 20, the x-y alignment of the lens assembly 30 with respect to the optoelectronic transceiver may be determined, as the x-y distance corresponds to the x-y alignment.

In some cases, the measurement of the x-y distance between the center 33 of the second lens 36 and the center 21 of the optoelectronic transceiver 20 may comprise accounting for a magnification factor of the optical microscope. With reference to the example shown in FIGS. 4 and 5, the geometric distance between the two centers 33, 21 depicted in FIG. 3, may take into account the 10× magnification that is used to view the second lens 36 and the optoelectronic transceiver 20 for defining the circumferences and calculating the respective centers (e.g., by dividing a depicted distance by 10 in this example to provide a "true" distance).

Once the x-y alignment is determined, the data regarding the alignment (which, in some cases, may be analyzed and/or stored by the computer software application referenced above) may be used in various ways to improve the function and operability of the optical module being tested and/or future production of optical modules. For example, in some embodiments, an expected loss of optical signal strength through the lens assembly 30 may be determined based on the x-y distance measured between the center 33 of the second lens 36 and the center 21 of the optoelectronic transceiver 20. One or more particular operating parameters may thus be specified for the tested optical module that will optimize its performance given the determined misalignments. Additionally or alternatively, an x-y position (e.g., a position within the x-y plane shown in FIG. 3) of the lens assembly 30 with respect to the optoelectronic transceiver 20 may be adjusted in the particular optical module being tested based on the x-y distance measured between the center 33 of the second lens 36 and the center 21 of the optoelectronic transceiver 20, as described in greater detail below. In still other cases, a manufacturing assembly parameter of a subsequent lens assembly 30 and/or PCBA may be adjusted based on the x-y distance measured between the center 33 of the second lens 36 and the center 21 of the optoelectronic transceiver 20 in order to improve the x-y alignment in future-produced optical modules.

In addition to determining an x-y alignment of the lens assembly 30 with respect to the optoelectronic transceiver 20, embodiments of the method may further comprise determining a z alignment of the lens assembly with respect to the optoelectronic transceiver. In particular, the observed size of a known dimension of the optoelectronic transceiver 20 should be based on the magnification of the optical microscope. For example, the observed diameter of the aperture of the VCSEL should be equal to the actual diameter of the aperture multiplied by the magnification of the optical microscope. Thus, for an aperture that is 7 µm in diameter (actual diameter), the observed diameter through an optical microscope set at 3× magnification should be 21 µm. When an actual observed diameter of the known dimension of the optoelectronic transceiver 20 (the aperture, in the above example) is different from the expected observed diameter, the difference between the actual observed diameter and the expected observed diameter corresponds to a disparity between the actual z distance of the optoelectronic transceiver 20 and the desired (e.g., optimal) z distance of the optoelectronic transceiver 20. Turning again to the VCSEL example above, where the expected observed diameter is 21 µm, if the actual observed diameter is smaller than the expected observed diameter (e.g., 20 µm instead of 21 µm), then the VCSEL is farther from the lens assembly than expected, and the actual z distance is larger than the desired z distance of the optoelectronic transceiver 20. If, on the other hand, the actual observed diameter is larger than the expected observed diameter (e.g., 22 µm instead of 21 µm), then the VCSEL is closer to the lens assembly than expected, and the actual z distance is shorter than the desired z distance of the optoelectronic transceiver 20.

Correlating the difference between the actual observed diameter and the expected observed diameter with the actual z distance between the first lens 32 of the lens assembly and the optoelectronic transceiver 20 may be done (e.g., by the computer software application described herein) based on a calibration exercise using a known z dimension, such as using a component of known thickness. Thus, in some embodiments, the correlation is based on a calibration event of the system used by the user for characterizing the location of optical components in the optical module under examination. In such cases, the user may first bring into focus, from the fiber point of view, a first surface of the optoelectronic transceiver 20 via the second lens 36 and the first lens 32. The first surface of the optoelectronic transceiver 20 may, for example, be a proximal surface 65 of the optoelectronic transceiver 20, as shown in FIG. 2. A first calibration focus setting for focusing on the first surface 65 of the optoelectronic transceiver 20 may thus be determined.

In addition, a second surface 68 of the optoelectronic transceiver 20 may be brought into focus, from the fiber point of view, via the second lens 36 and the first lens 32 of the lens assembly 30, and a second calibration focus setting for focusing on the second surface 68 of the optoelectronic transceiver 20 may be determined. A difference between the first calibration focus setting and the second calibration focus setting may thus be correlated with a known thickness t of the optoelectronic transceiver 20. This calibrated difference in focus settings may, in turn, be used calculate the difference in z distance (actual observed z distance versus expected observed z distance) based on the actual observed size of the known dimension of the optoelectronic transceiver 20 (e.g., the actual observed diameter of the aperture of the VCSEL).

As described above with respect to x-y alignment, data collected regarding the z alignment may be used in various ways. For example, in some embodiments, a z position of the lens assembly 30 with respect to the optoelectronic transceiver 20 may be adjusted based on the z distance calculated between the surface 65 of the optoelectronic transceiver and the surface 60 of the first lens 32. Additionally or alternatively, a manufacturing assembly parameter of a subsequent lens assembly may be adjusted based on the z distance calculated between the surface 65 of the optoelectronic transceiver 20 and the surface 60 of the first lens 32.

Figure 6:
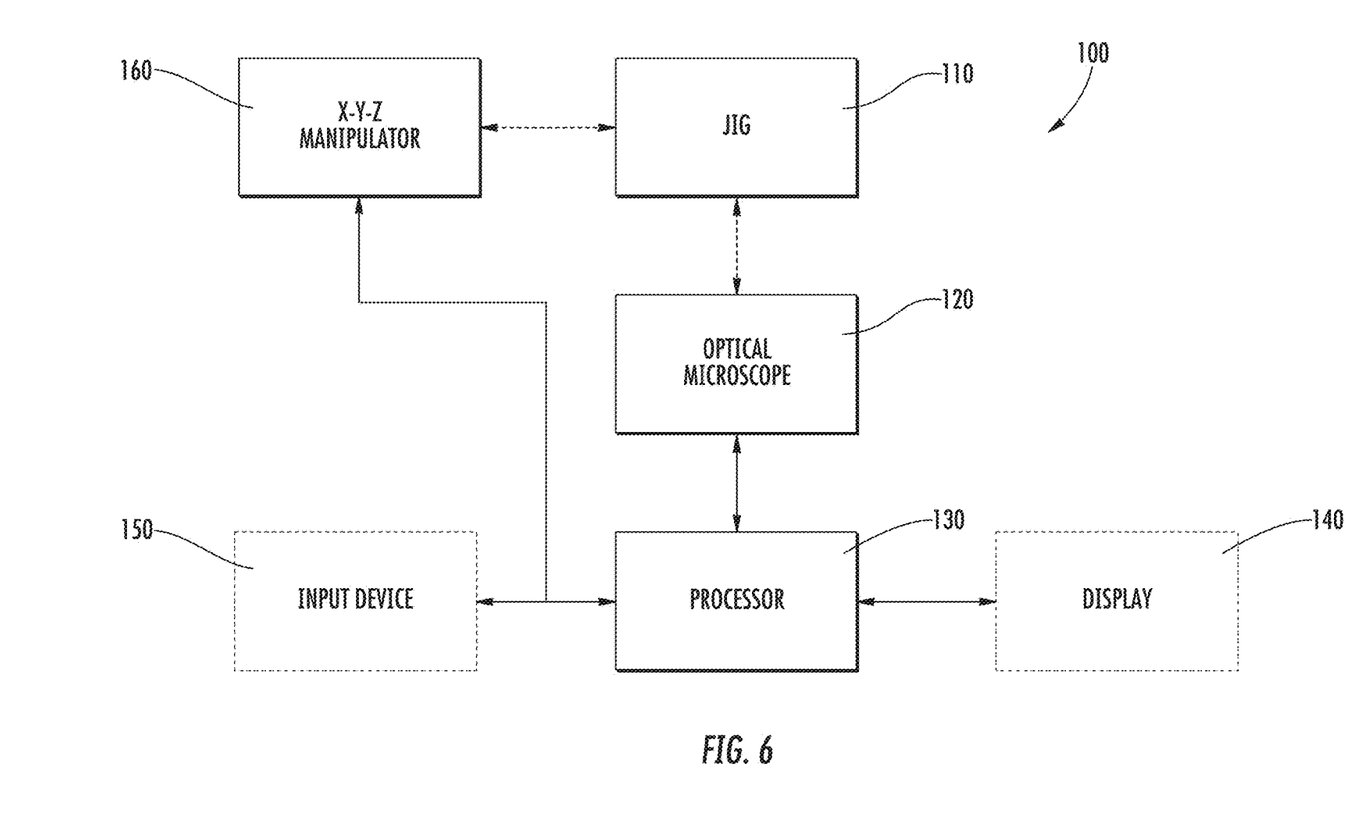
FIG. 6 is a schematic illustration of components of a system for characterizing a location of optical components according to an example embodiment.

Referring now to FIG. 6, a system 100 is described for characterizing a location of optical components in an optical module according to embodiments of the method described above. Embodiments of the system 100 comprise a jig 110 (shown in greater detail in FIG. 7) configured to receive a printed circuit board assembly (PCBA) comprising a printed circuit board 15 having an optical module. As described above in reference to FIG. 2, the optical module may comprise an optoelectronic transceiver 20 configured to convert between electrical signals and optical signals and a lens assembly 30 supported by the printed circuit board 15 at a spaced apart position relative to the optoelectronic transceiver and configured to communicate optical signals between the optoelectronic transceiver and an optical fiber 40 (shown in FIG. 1). The lens assembly 30 may have a first lens 32, a second lens 36 substantially perpendicular to the first lens 32, and a mirror 34 configured to direct optical signals between the first lens and the second lens, as illustrated in FIG. 2, for example.

Figure 7:
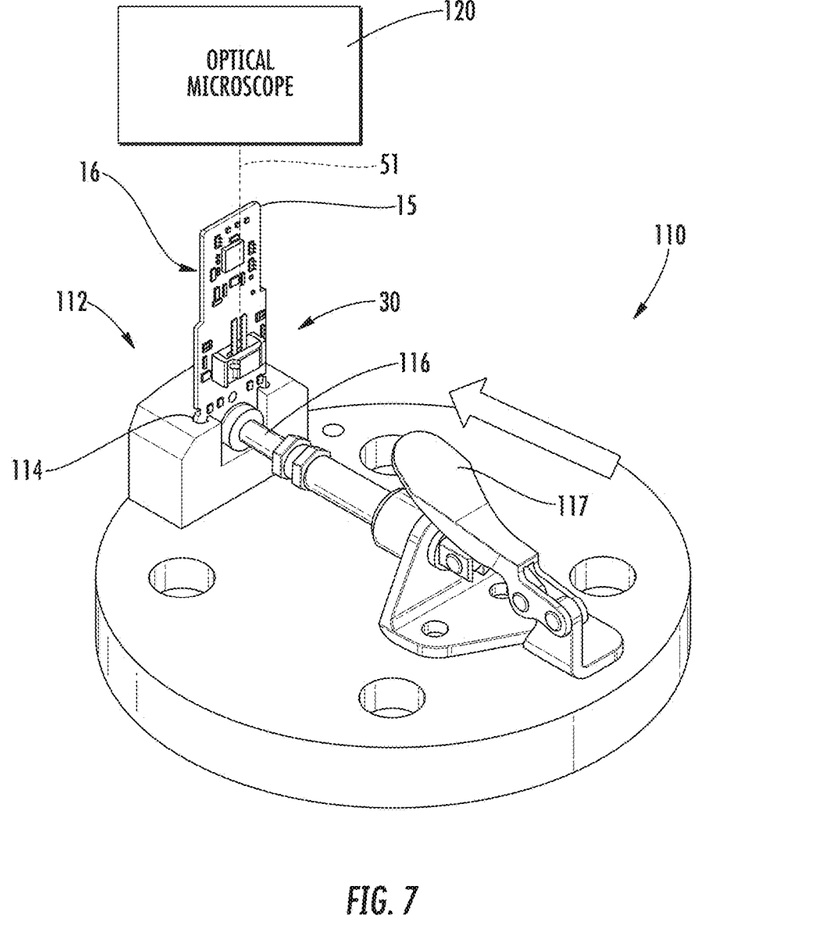
FIG. 7 is a schematic perspective view of a jig configured to receive and hold a PCBA for performing embodiments of the method described herein according to an example embodiment.

The system 100 may further comprise an optical microscope 120 positioned relative to the jig 110 such that when a PCBA 16 is received by the jig, the optical microscope is disposed proximate the second lens of the lens assembly, as schematically depicted in FIG. 7. In this way, the line of sight 51 of a user viewing the lens assembly 30 through the optical microscope 120 will pass through the second lens 36 and be redirected via the mirror 34 to the first lens 32 and the optoelectronic transceiver 20, as shown in FIG. 2.

Embodiments of the system 100 further comprise a processor 130 configured to process inputs received via image data obtained from the optical microscope 120 for determining an x-y alignment of the lens assembly 30 with respect to the optoelectronic transceiver 20, such as described above with respect to FIGS. 2-5. For example, in some cases, the system 100 further includes a display 140 in communication with the processor 130, wherein the display is configured for presenting the image data obtained from the optical microscope 120. For example, the optical microscope 120 may include a camera or other image capturing device configured to capture the image data corresponding to the images the user is viewing through the optical microscope, and the image data may in turn be presented to the user via the display 140.

In this regard, the system 100 may further include an input device 150 that is configured to receive inputs from a user (e.g., the user of the optical microscope 120) that, via the processor 130, can be used to control operating parameters of the optical microscope 120 (e.g., magnification, line of sight, etc.). Moreover, in some embodiments, the inputs received (e.g., via the input device 150) may provide the input to the processor 130 for determining the x-y alignment of the lens assembly 30 with respect to the optoelectronic transceiver 20. For example, the user may utilize the input device 150 (which may be a mouse or a touch screen of the display) to indicate three points on a circumference of the image of the first lens and/or the optoelectronic transceiver for defining the circle and, thereby, obtain a geometric center of the defined circle, as described above, for determining the x-y alignment of the lens assembly 30 with respect to the optoelectronic transceiver 20.

In some cases, the processor 130 may be further configured to process the inputs received via the image data obtained from the optical microscope (e.g., the inputs provided by the user via the input device 150 with reference to the image data presented on the display 140) for determining a z alignment of the lens assembly with respect to the optoelectronic transceiver, as described above with reference to FIGS. 2-5. For example, the user may provide inputs via the input device 150 that adjust the magnification of the optical microscope 120 and/or for adjusting a focus setting of the optical microscope for focusing on a particular portion or surface of the first lens 32, the second lens 36, and/or the optoelectronic transceiver 20. The magnification and/or focus settings may in turn be used by the processor to determine the z alignment as described above. Moreover, in some embodiments, the processor 130 may be configured to determine an adjusted manufacturing parameter, as described above, based at least on the determined x-y alignment and may be further configured to communicate the adjusted manufacturing parameter to a component or station of a production line. Additionally or alternatively, the processor 130 may be configured to determine an expected loss of signal power through the optical module based at least on the determined x-y alignment, as described above and/or determine operating parameters for the particular PCBA to compensate for the expected losses.

Additional components may be included in the system that are not depicted in FIG. 6, such as a memory for storing obtained image data, data input by the user or calculated by the processor (e.g., x-, y-, and z-distances), operating parameters of the optical microscope, data received from the production line (e.g., manufacturing assembly parameters at various stations along the production line), and so on. Moreover, the memory may, in some cases, include computer program code (e.g., defining a software application), and the memory and the computer program code may be configured to, with the processor, cause the system to perform the functions (e.g., perform calculations, adjust parameters, communicate with other components of the system, etc.) described herein. In this regard, the memory may comprise a computer-readable storage medium, which refers to a physical storage medium (e.g., volatile or non-volatile memory device), that can be differentiated from a computer-readable transmission medium, which refers to an electromagnetic signal.

With reference to FIG. 7, the jig 110 of the system 100 may be configured to receive and retain a PCBA 16 comprising the printed circuit board 15 with the lens assembly 30 and optoelectronic transceiver 20 (not visible in FIG. 7) in a position that allows a user to utilize the optical microscope 120 to view portions of the PCBA for collecting the data described above and determining an x-y alignment and/or a z alignment of the lens assembly with respect to the optoelectronic transceiver. In some embodiments, for example, the jig 110 may comprise a holding portion 112 having a trench 114 configured to receive an end of the PCBA 16 and a clamp 116 configured to be actuated by a user (such as via a handle 117) for securing the end of the PCBA within the trench. For example, by moving the handle 117 towards the PCBA 16 (in the direction of the arrow), the clamp 116 in some embodiments may be caused to move towards and into engagement with the retained end of the PCBA 16 and may, thus, cooperate with a wall of the trench to secure the PCBA in a fixed position for examination. In this regard, the clamp 116 may be configured to telescope or otherwise extend towards and retract from engagement with the end of the PCBA 16 in response to actuation of the handle 117 by the user, as will be understood by those skilled in art in light of this disclosure.

In some embodiments, the system 100 of FIG. 6 may further comprise an x-y-z manipulator 160 in communication with the processor 130 and configured to adjust a position of the lens assembly 30 of the PCBA 16 relative to a position of the optoelectronic transceiver 20 based at least on the determined x-y alignment and/or the determined z alignment. In this regard, the system 100 may be configured to receive the PCBA 16 (e.g., via the jig 110) during a mid-cure state of the epoxy used to secure at least one of the lens assembly 30 or the optoelectronic transceiver 20 to the printed circuit board 15, thereby enabling the x-y-z manipulator to adjust the position of the lens assembly relative to the position of the optoelectronic transceiver prior to full cure of the PCBA (e.g., while the components are still moveable to some degree and the epoxy has not yet fully cured). In this regard, the tolerances of the x-y-z manipulator are generally more accurate (tighter tolerances) than the tolerances associated with the x-, y-, and z-distances that are needed for optimally positioning the lens assembly relative to the position of the optoelectronic transceiver.

Many modifications and other embodiments of the inventions set forth herein will come to mind to one skilled in the art to which these inventions pertain having the benefit of the teachings presented in the foregoing descriptions and the associated drawings. Although the figures only show certain components of the apparatus and systems described herein, it is understood that various other components (e.g., components that would normally be mounted on the PCB as part of the PCBA or the optical module) may also be part of the described system. Moreover, although certain configurations of the optical module are shown, it would be understood by one skilled in the art that the examples and configurations provided herein may be simplified for purposes of explanation, and embodiments of the invention described herein may be equally applicable in other types of optical modules.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. Moreover, although embodiments of the invention described herein refer to optical modules with respect to groups of components that cooperatively convert electrical signals to optical signals and likewise refer to optical modules with respect to groups of components that cooperatively convert optical signals into electrical signals, it is understood in light of this disclosure that in some configurations an optical module may have components that convert electrical signals to optical signals for transmission in one direction and may also have components that convert optical signals to electrical signals upon receipt of the optical signals in the opposite direction. For example, in some cases, an optical module may include optoelectronic transceivers in the form of both VCSELS and photodiodes. As such, in some embodiments, the lens assembly may comprise an array of first lenses and an array of second lenses, with one or more mirrors for directing optical signals therebetween. For example, an array of twelve sets of lenses may be provided in some embodiments of the lens assembly, such that each set is configured to align with an optoelectronic transceiver provided on the printed circuit board (e.g., VCSEL or photodiode). Accordingly, embodiments of the invention described above are applicable to optical modules having combined groupings of components in such various configurations.

What is claimed is:

1. A method of characterizing a location of optical components in an optical module comprising:
    determining an x-y alignment of a lens assembly comprising a first lens and a second lens with respect to an optoelectronic transceiver by:
        viewing, from a fiber point of view, a focal point A defined by the second lens of the lens assembly,
        focusing on the second lens with respect to the focal point A,
        determining a center of the focused second lens,
        viewing, from the fiber point of view, the optoelectronic transceiver via the focused second lens and a focal point B defined by the first lens,
        wherein a line of sight for viewing the first and the second lenses is directed between the first lens and the second lens via a mirror,
        determining a center of the optoelectronic transceiver viewed via the first lens and the focused second lens, and
        measuring an x-y distance between the center of the focused second lens and the center of the optoelectronic transceiver as viewed, wherein the x-y distance corresponds to the x-y alignment of the lens assembly with the optoelectronic transceiver.

2. The method of claim 1, wherein viewing, from a fiber point of view, the second lens of the lens assembly comprises using an optical microscope to view the second lens of the lens assembly.

3. The method of claim 2, wherein measuring the x-y distance between the center of the second lens and the center of the optoelectronic transceiver comprises accounting for a magnification factor of the optical microscope.

4. The method of claim 1 further comprising determining an expected loss of optical signal strength through the lens assembly based on the x-y distance measured between the center of the second lens and the center of the optoelectronic transceiver.

5. The method of claim 1 further comprising adjusting an x-y position of the lens assembly with respect to the optoelectronic transceiver based on the x-y distance measured between the center of the second lens and the center of the optoelectronic transceiver.

6. The method of claim 1 further comprising adjusting a manufacturing assembly parameter of a subsequent optical module based on the x-y distance measured between the center of the second lens and the center of the optoelectronic transceiver.

7. The method of claim 1 further comprising determining a z alignment of the lens assembly with respect to the optoelectronic transceiver by:
    determining an observed dimension of a component of the optoelectronic transceiver at a given magnification of an optical microscope, wherein the component has an actual dimension;
    calculating an expected observed dimension of the component based on the given magnification of the optical microscope;
    calculating a difference between the observed dimension and the expected observed dimension of the component; and
    correlating the difference between the observed dimension and the expected observed dimension of the component with a difference between an actual z distance between a surface of the optoelectronic transceiver and a surface of the first lens and an expected z distance between the surface of the optoelectronic transceiver and the surface of the first lens, and wherein the difference in z distances corresponds to the z alignment of the lens assembly with the optoelectronic transceiver.

8. The method of claim 7 further comprising adjusting a z position of the lens assembly with respect to the optoelectronic transceiver based on the difference in z distances between the surface of the optoelectronic transceiver and the surface of the first lens that is determined.

9. The method of claim 7 further comprising adjusting a manufacturing assembly parameter of a subsequent lens assembly based on the difference in z distances between the surface of the optoelectronic transceiver and the surface of the first lens that is determined.

10. The method of claim 7 further comprising:
focusing on a first surface of the optoelectronic transceiver via the second lens and the first lens,
determining a first calibration focus setting for focusing on the first surface of the optoelectronic transceiver,
focusing on a second surface of the optoelectronic transceiver via the second lens and the first lens,
determining a second calibration focus setting for focusing on the second surface of the optoelectronic transceiver, and
correlating a difference between the first and second calibration focus settings with a known thickness of the optoelectronic transceiver,
wherein the difference between the observed dimension and the expected observed dimension of the component is correlated with a difference between an actual z distance between a surface of the optoelectronic transceiver and a surface of the first lens and an expected z distance between the surface of the optoelectronic transceiver and the surface of the first lens using the correlated difference between the first and second calibration focus settings.

11. The method of claim 1, wherein the optoelectronic transceiver is a vertical-cavity surface-emitting laser (VCSEL) or a photodiode.

12. The method of claim 1, wherein the optoelectronic transceiver is a photodiode.

13. A system for characterizing a location of optical components in an optical module comprising:
a jig configured to receive a printed circuit board assembly (PCBA) comprising a printed circuit board having an optical module attached thereto, wherein the optical module comprises an optoelectronic transceiver configured to convert between electrical signals and optical signals and a lens assembly supported by the printed circuit board at a spaced apart position relative to the optoelectronic transceiver and configured to communicate optical signals between the optoelectronic transceiver and an optical fiber, the lens assembly having a first lens, a second lens substantially perpendicular to the first lens, and a mirror configured to direct optical signals between the first lens and the second lens;
an optical microscope positioned relative to the jig such that when a PCBA is received by the jig, the optical microscope is disposed proximate the second lens of the lens assembly; and
a processor configured to process inputs received via image data obtained from the optical microscope for determining an x-y alignment of the lens assembly with respect to the optoelectronic transceiver by:
viewing, from a fiber point of view, a focal point A defined by the second lens of the lens assembly,
focusing on the second lens with respect to the focal point A,
determining a center of the focused second lens,
viewing, from the fiber point of view, the optoelectronic transceiver via the focused second lens and a focal point B defined by the first lens,
determining a center of the optoelectronic transceiver viewed via the first lens and the focused second lens, and
measuring an x-y distance between the center of the focused second lens and the center of the optoelectronic transceiver as viewed, wherein the x-y distance corresponds to the x-y alignment of the lens assembly with the optoelectronic transceiver.

14. The system of claim 13, wherein the processor is further configured to process the inputs received via the image data obtained from the optical microscope for determining a z alignment of the lens assembly with respect to the optoelectronic transceiver.

15. The system of claim 13 further comprising a display in communication with the processor, wherein the display is configured for presenting the image data obtained from the optical microscope.

16. The system of claim 13, wherein the jig comprises a holding portion having a trench configured to receive an end of the PCBA and a clamp configured to be actuated by a user for securing the end of the PCBA within the trench.

17. The system of claim 13, wherein the processor is configured to determine an adjusted manufacturing parameter based at least on the determined x-y alignment and communicate the adjusted manufacturing parameter to a component of a production line.

18. The system of claim 13 further comprising an x-y-z manipulator in communication with the processor and configured to adjust a position of the lens assembly of the PCBA relative to a position of the optoelectronic transceiver based at least on the determined x-y alignment.

19. The system of claim 18, wherein the system is configured to receive the PCBA during a mid-cure state of epoxy securing at least one of the lens assembly or the optoelectronic transceiver to the printed circuit board, thereby enabling the x-y-z manipulator to adjust the position of the lens assembly relative to the position of the optoelectronic transceiver prior to full cure of the PCBA.

20. The system of claim 13, wherein the processor is configured to determine an expected loss of signal power through the optical module based at least on the determined x-y alignment.

* * * * *